United States Patent [19]
Ebrahim

[11] Patent Number: 5,987,557
[45] Date of Patent: Nov. 16, 1999

[54] METHOD AND APPARATUS FOR IMPLEMENTING HARDWARE PROTECTION DOMAINS IN A SYSTEM WITH NO MEMORY MANAGEMENT UNIT (MMU)

[75] Inventor: Zahir Ebrahim, Mountain View, Calif.

[73] Assignee: Sun Microsystems, Inc., Mountain View, Calif.

[21] Appl. No.: 08/879,124

[22] Filed: Jun. 19, 1997

[51] Int. Cl.[6] .................................................. G06F 13/15
[52] U.S. Cl. ................................................................ 710/200
[58] Field of Search ............................. 395/186–188.01, 395/726, 677; 707/9; 380/25; 711/163; 713/200–202; 710/200, 107; 709/107

[56] References Cited

U.S. PATENT DOCUMENTS

| | | | |
|---|---|---|---|
| 5,265,221 | 11/1993 | Miller | 711/163 |
| 5,513,337 | 4/1996 | Gillespie et al. | 711/152 |
| 5,590,326 | 12/1996 | Manabe | 711/150 |
| 5,623,636 | 4/1997 | Revilla et al. | 711/163 |
| 5,627,987 | 5/1997 | Nozue et al. | 711/200 |
| 5,649,159 | 7/1997 | Le et al. | 711/163 |
| 5,668,973 | 9/1997 | Stutz et al. | 711/152 |
| 5,678,027 | 10/1997 | Pockrandt et al. | 711/163 |
| 5,706,469 | 1/1998 | Kobayashi | 395/287 |
| 5,809,544 | 9/1998 | Dorsey et al. | 711/163 |
| 5,813,043 | 9/1998 | Iles et al. | 711/163 |

*Primary Examiner*—Paul R. Myers
*Attorney, Agent, or Firm*—Skjerven, Morrill, MacPherson, Franklin & Friel LLP; Ken J. Koestner

[57] ABSTRACT

A low overhead, efficient, and simple protection check circuit is inserted into a data path between a master requester and a target resource such as a memory or input/output device. The master requester initiates a memory request, a pio access request, or a dma transaction directed to the target resource. For example, the master requester may be a processor accessing a memory, a processor performing programmed I/O (pio). Alternatively, the master requester may be a DMA device performing direct memory access of a memory. The protection check circuit is configured at initialization time by an operating system or a privileged software process, then passively monitors all transactions on the data paths, disallowing accesses that fail the protection check operation.

30 Claims, 8 Drawing Sheets

METHOD AND APPARATUS FOR IMPLEMENTING HARDWARE PROTECTION DOMAINS IN A SYSTEM WITH NO MEMORY MANAGEMENT UNIT (MMU)

BACKGROUND OF THE INVENTION

1. Field of the Invention

The present invention relates generally to a system and method for controlling access to system resources in hardware, most particularly in a system including a processor, memory, and devices, but including neither a processor memory management unit (PMMU) nor an input/output memory management unit (IOMMU).

2. Description of the Related Art

Generally user process_level protection in CPU-based hardware systems such as computer systems and embedded controller systems is supplied by a system memory management unit (MMU). The MMU in a conventional system performs several functions including address translation from virtual to physical addresses, and remapping and realigning of noncontiguous physical address segments into contiguous virtual addresses. The MMU of a conventional system also controls access to system hardware resources using protection checks built into MMU logic. This access control prevents one user-level process from writing into physical memory pages assigned to another process, reading from the physical memory pages or executing from the physical memory pages. The access control functionality of the MMU of a conventional system also supplies address mapping to input/output devices under control of an operating system such that a user process with no mapping to the input/output device does not even detect that the input/output device is present in the system.

Unfortunately memory address protection is compromised in systems that do not include memory management unit hardware and in systems that do include a memory management unit but employ an operating system that does not exploit the protection capabilities of the MMU. User-level resource protection is difficult to achieve in a system that does not include or fails to exploit MMU hardware. In some real-time embedded systems, the memory management unit (MMU) may not be used due to the overhead of managing virtual memory. In a system that does not exploit the MMU, either an entire application executes in a single kernel context or multiple user-level contexts trap into a single kernel context for device access.

A system that runs the Java™ Virtual Machine (JVM) is an example of a system that does not use an MMU but operates in an environment that generally demands resource protection. The Java™ Virtual Machine (JVM) is available from Sun Microsystems, Inc. and supports a multi-threaded environment for the Java™ programming language (also available from Sun Microsystems, Inc). Java, SpecJava, Sun, Sun Microsystems and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

The JVM allows multiple tasks to execute within a common address space in a well-defined and secure environment. Resource protection is highly advantageous in the JVM environment since, although JVM supports multitasking, many applications run multiple instances of the JVM with each instance generally using resources independently of the other instances but concurrently with the execution of the other instances.

The JVM may be used with an operating system or without an operating system. For example, in a workstation or computer environment running the Unix operating system that supports multiple user processes, many instances of JVM execute concurrently with the Unix operating system supplying access control to resources. However in other systems, such as embedded controllers or systems executing on a processor with no memory management unit (MMU), access control to input/output devices is not ensured even when the underlying operating system supplies independent sections of memory address space for execution of each process. In such systems, access control is typically achieved only indirectly by an application. Direct user-level access control of system devices is not available in hardware.

Resource protection is difficult or impossible to achieve efficiently in a conventional JVM system with no MMU support since such protection is only implemented using software-based techniques executing inside the operating system that hosts the JVM. Such software-based protection entails a heavy overhead burden. One example of a technique for indirectly controlling access is the issuance of a system call by a process that directs a kernel to access the input/output device on behalf of the operating system.

What is needed is a system and technique for controlling process level access to devices such as memory and input/output (I/O) devices from user space in the absence of a memory management unit (MMU) and when the MMU access control functionality is not exploited.

SUMMARY OF THE INVENTION

In accordance with an embodiment of the present invention, a low overhead, efficient, and simple protection check circuit is inserted into a data path between a master requester and a target resource such as a memory or input/output device. The master requester initiates a memory request, a pio access request, or a dma transaction directed to the target resource. For example, the master requester may be a processor accessing a memory, a processor performing programmed I/O (pio). Alternatively, the master requester may be a DMA device performing direct memory access of a memory. The protection check circuit is configured at initialization time by an operating system or a privileged software process, then passively monitors all transactions on the data paths, disallowing accesses that fail the protection check operation.

A protection domain is an address space or a range of addresses that are to be protected to achieve access control of system resources. In a system having resources that are accessed using memory mapping, protection of an address space is equivalent to protection of the resource in the mapped address space. Generally, the address space in a system is defined by hardware and is accessed by software using memory-mapped transactions. The terms protection domain and protected address space are synonymous.

In accordance with some embodiments of the present invention, protection domains are implemented external to a processor or central processing unit (CPU) in a protection check logic (PCL) block. Protection check logic (PCL) blocks are variously implemented in an address decode logic path, a memory controller path, and an input/output (I/O) device controller path. In various embodiments, a system may include several PCL blocks in selected combinations of paths. The protection check logic block defines an access control list (ACL) for the protected resources on a per-user process basis. Protection domains enable running of multiple processes on a processor or multiple processors with no memory management unit or on a processor or multiple processors which do not utilize an available memory management unit. Protection domains advantageously protect a system from a user process that inadvertently or intentionally violates security of the system.

In accordance with embodiments of the present invention in a Java™ Virtual Machine environment, protection domains enable running of multiple instances of Java™ Virtual Machines, one in each user-level process, on Java™ processors or other processors that do not include a memory management unit, and enables granting to each instance of the Java™ Virtual Machine differing access rights to system-wide resources.

In accordance with an aspect of the present invention, protection check logic blocks are advantageous in any applications and embodiments for which protection checking and access control list features are useful but a processor is deficient is supplying such features.

In accordance with an additional aspect of the present invention, protection check logic blocks are useful in systems utilizing a processor with a memory management unit but for which MMU protection does not extend to direct memory access (DMA) functionality.

In accordance with an embodiment of the present invention, a resource protection apparatus controls access to a resource on a transaction path between an access request device and the resource. The resource protection apparatus includes an access control path connected to the transaction path in parallel with the transaction path and a protection check logic connected to the access control path for snooping on transactions on the transaction path. The protection check logic further includes a storage connected to the protection check logic. The storage stores transaction allowability data. The protection check logic also includes a decision logic connected to the storage. The decision logic compares transaction data on the transaction path to transaction allowability data from the storage and generates an allowability signal on the basis of the comparison. The allowability signal is generated in time to abort a disallowed transaction.

Many advantages are gained by the described resource protection apparatus and operating method. It is advantageous that the resource protection apparatus protects resources in the absence of a memory management unit with a simple, low-gate-count protection technique that allows privileged access to a supervisor. The resource protection apparatus advantageously performs a protection logic check operation in parallel with the direct memory access communication operation so that access latency is not delayed.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Figure 1:
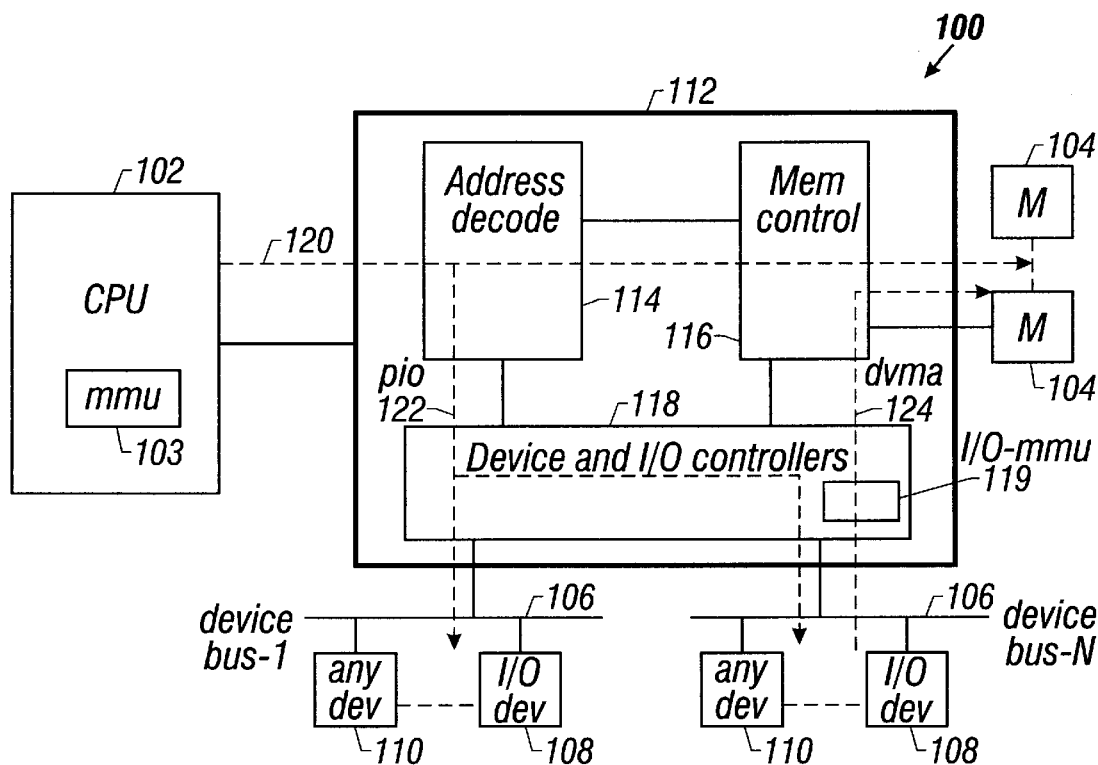
FIG. 1 is a schematic block diagram which depicts an embodiment of a computer system including access control of resources by a processor memory management unit (PMMU) for protecting address spaces in the system and an input/output memory management unit (IOMMU) for protecting a faulty DMA controller from corrupting main memory by writing into the memory address locations of other processes.

Referring to FIG. 1, a schematic block diagram illustrates an embodiment of a computer system 100 including access control of resources by a processor memory management unit (PMMU) 103 for protecting address spaces in the system and an input/output memory management unit (IOMMU) 119 for protecting a faulty DMA controller from corrupting main memory by writing into the memory address locations of other processes. The computer system 100 includes a processor 102 with a processor memory management unit (PMMU) 103, one or more memory blocks 104, one or more input/output (I/O) buses 106 connected to a plurality of devices including input/output (I/O) devices 108 and other devices 110, and a system controller block 112. The system controller block 112 controls access of the processor 102 to various devices including memory blocks 104, I/O devices 108, and other devices 110. A transaction path 120 interconnects the processor 102, the memory blocks 104, and the I/O buses 106. The PMMU 103 protects the address space of the memory blocks 104, the I/O devices 108, and the other devices 110.

The system controller block 112 includes an address decoder 114, a memory controller 116, and a device and I/O controller 118. The address decoder 114 receives access control signals from the processor 102 including signals designating the type of access, either read or write access, and the address to be accessed. Some addresses apply to the memory blocks 104 and designate a memory space of the total address space. Some addresses apply to the I/O devices 108 and other devices 110 on the I/O buses 106 and designate an I/O space of the total address space.

The memory controller 116 is connected to the address decoder 114 and receives address signals from the address decoder 114 designating addresses in the memory space for accessing data in memory read or memory write operations. Data is transferred between the processor 102 and the memory blocks 104 via the transaction path 120 to access a memory address designated by the processor 102 in a memory transfer direction designated by the processor 102. The memory controller 116 also includes an interface such as a DMA controller or bus controller.

The device and I/O controller 118 is connected to the address decoder 114 via a programmed input/output (PIO) bus 122 for transferring data between the processor 102 and a device connected to the I/O buses 106. The device and I/O controller 118 is connected to the memory controller 116 via a direct memory access (DMA) bus 124 to transfer data directly between the memory blocks 104 and a device connected to the I/O buses 106. The device and I/O controller 118 includes an input/output memory management unit (IOMMU) 119 that protects the memory blocks 104 from errant dma transfers from the I/O devices 108 and other devices 110 via the DMA bus 124.

The processor 102 serves as a master requester for requesting memory, input/output, and DMA accesses via the transaction path 120. The processor 102 requests memory accesses directed to the memory blocks 104, input/output accesses directed to the I/O devices 108 and the other devices 110 via the PIO bus 122, and DMA accesses directed from the I/O devices 108 and other devices 110 to the memory blocks 104 via the DMA bus 124.

Figure 2:
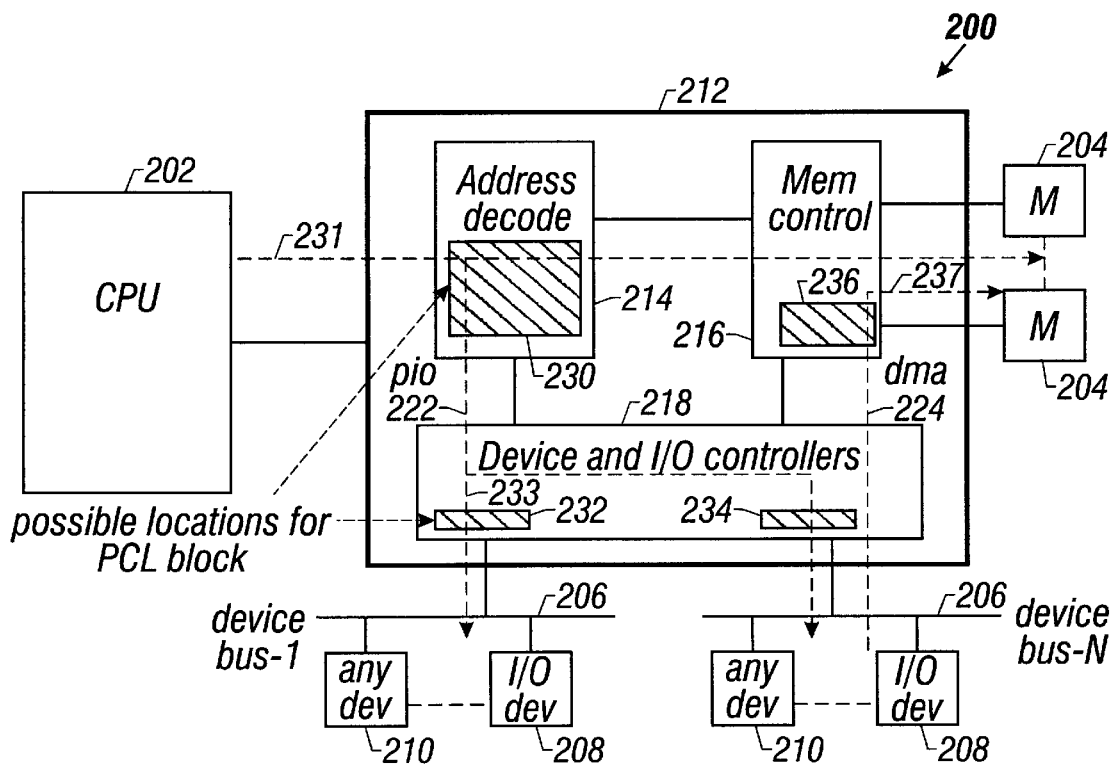
FIG. 2 is a schematic block diagram showing an embodiment of a computer system including a protection check logic (PCL) block to support address space protection.

Referring to FIG. 2, a schematic block diagram illustrates an embodiment of a computer system 200 including a plurality of protection check logic (PCL) blocks 230, 232, 234, and 236 to support address space protection. In the illustrative embodiment, the PCL blocks include a memory access PCL block 230 in a memory access transaction path 231, a first PIO PCL block 232 and a second PIO PCL block 234 in a PIO transaction path 233, and a Direct Virtual Memory Access (DVMA) PCL block 236 in a DVMA transaction path 237.

In other embodiments, a system may include one or more protection check logic (PCL) blocks located external to the processor 202 in various positions and using various numbers of PCL blocks. For example, a separate PCL block may be located in each transaction path in a system with multiple transaction paths. In another embodiment, all transaction paths may pass through a single common PCL block. In other embodiments, a PCL block may be shared by two or more transaction paths while other transaction paths are protected by a single PCL block.

The computer system 200 includes a processor 202, one or more memory blocks 204 protected by the memory access PCL block 230, one or more input/output (I/O) buses 206 connected to a plurality of devices including input/output (I/O) devices 208 and other devices 210 protected by the first PIO PCL block 232 and the second PIO PCL block 234. The computer system 200 also includes a system controller block 212. The system controller block 212 controls access of the processor 202 to various devices including memory blocks 204, I/O devices 208, and other devices 210.

The system controller block 212 includes an address decoder 214, a memory controller 216, and a device and I/O controller 218. The address decoder 214 includes the memory access PCL block 230 and receives access control signals from the processor 202 including signals designating the type of access, either read or write access, and the address to be accessed. Some addresses apply to the memory blocks 204 and designate a memory space of the total address space. Some addresses apply to the I/O devices 208 and other devices 210 on the I/O buses 206 and designate an I/O space of the total address space.

The memory controller 216 is connected to the address decoder 214 and includes the Direct Virtual Memory Access (DVMA) PCL block 236. The memory controller 216 receives address signals from the address decoder 214 designating addresses in the memory space for accessing data in memory read or memory write operations. Data is transferred between the processor 202 and the memory blocks 204 via the memory access transaction path 231 to access a memory address designated by the processor 202 in a memory transfer direction designated by the processor 202. The memory controller 216 also includes an interface such as a DMA controller or bus controller. The memory access transaction path 231 is protected by the memory access PCL block 230 and protects the memory blocks 204 against improper accesses by the processor 202 as master requester.

The device and I/O controller 218 includes the first PIO PCL block 232 and the second PIO PCL block 234 and is connected to the address decoder 214 via a programmed input/output (PIO) bus 222 for transferring data between the processor 202 and a device connected to the I/O buses 206. The first PIO PCL block 232 and the second PIO PCL block 234 supply protection to programmed input/output accesses. Most particularly, the first PIO PCL block 232 and the second PIO PCL block 234 supply controlled and protected access at a user process level as well as a kernel or operating system level to system address spaces. The PIO transaction path 233 is protected by the first PIO PCL block 232 and the second PIO PCL block 234 and protects the I/O devices 208 and other devices 210 against improper accesses by the processor 202 as master requester.

In addition to PIO protection, direct memory access protection is also implemented using the Direct Virtual Memory Access (DVMA) PCL block 236. The device and I/O controller 218 is connected to the memory controller 216 via a direct virtual memory access (DVMA) bus 224 to transfer data directly between the memory blocks 204 and a I/O devices 208 or other devices 210 connected to the I/O buses 206. The DVMA transaction path 237 is protected by the DVMA PCL block 236 and protects the memory blocks 204 against improper accesses directed from the I/O devices 208 and other devices 210 to the memory blocks 204 via the DMA bus 224. The DVMA PCL block 236 also protects memory in the memory blocks 204 that is shared by one or more processes against corruption by a bad dma controller or device.

The various PCL blocks 230, 232, 234, and 236 implement protection domains for the computer system 200. The protection domains are address spaces of varying sizes that map to system resources. The address sizes range in size and complexity from a simple single register or range of main memory addresses to an entire input/output bus or slave address space of an I/O device such as a frame buffer or printer port.

A model for access control is expressed by equation (1) as follows:

$$pass|nopass = f(who[\ ], rw, PA[\ ]),$$

where the function $f$ is implemented at various levels of address granularity and may take several forms, some of which are discussed in more detail hereinafter and others which are well known in the art of resource protection. Who[] is an array that specifies the particular process for which an address space is protected and is discussed in more detail hereinafter. The parameter rw specifies whether a transaction is a read or write transaction. PA[] is an array designating bits of the address from the current transaction request. The result "pass" is asserted if the input signals presented to the PCL block are granted access rights. Otherwise "pass" remains unasserted and the sampling of the pass|nopass function when "pass" is unasserted by the controller in which the PCL block resides indicates a "nopass" result. A "nopass" result triggers an implementation-dependent error handling response (not shown) such as an assertion of a predefined error signal to the master requester and logging of the error condition in an error handling register (not shown).

The memory access PCL block 230 is connected in a path parallel to the memory access transaction path 231 from the address decoder 214 to the memory blocks 204. The path of the memory access PCL block 230 is outside the critical timing path for initiating a memory timing cycle. Thus the memory timing cycle is initiated in parallel with performance of the protection check operation but is not delayed by the protection check operation unless the protection check fails with a "nopass" result". A protection check failure causes subsequent inhibition of a memory cycle. The memory access PCL block 230 is positioned outside the critical timing path of the memory timing cycle to prevent impact upon the memory access latency of the computer system.

The first PIO PCL block 232 and the second PIO PCL block 234 connected in the PIO transaction path 233 between the address decoder 214 and the I/O devices 208 and other devices 210 may interpose into the critical timing path of the memory timing cycle, particularly if the PIO bus 222 supplies a high bandwidth signal path that should not be delayed. To avoid signal timing delays, the first PIO PCL block 232 and the second PIO PCL block 234 are pipelined in a path that is parallel to the actual PIO transaction path 233 such that the result of the protection check is available just previous to initiation of device access on the I/O buses 206. For some devices of the I/O devices 208 and other devices 210, a PIO access, once initiated, cannot be canceled so that the protection check is constrained to complete prior to initiation of a device request.

The DVMA PCL block 236 does not affect latency of the DVMA transaction path 237 since the DVMA PCL block 236 does not perform address translation for the direct memory access operation. The DVMA PCL block 236 advantageously performs a protection logic check operation in parallel with the direct memory access communication operation. In contrast, a conventional memory management unit for usage in address translation is connected in series and may affect dma latency.

Multiple protection check logic (PCL) blocks including different implementations of PCL blocks may be deployed in a system, depending on design specifications.

Figure 3:
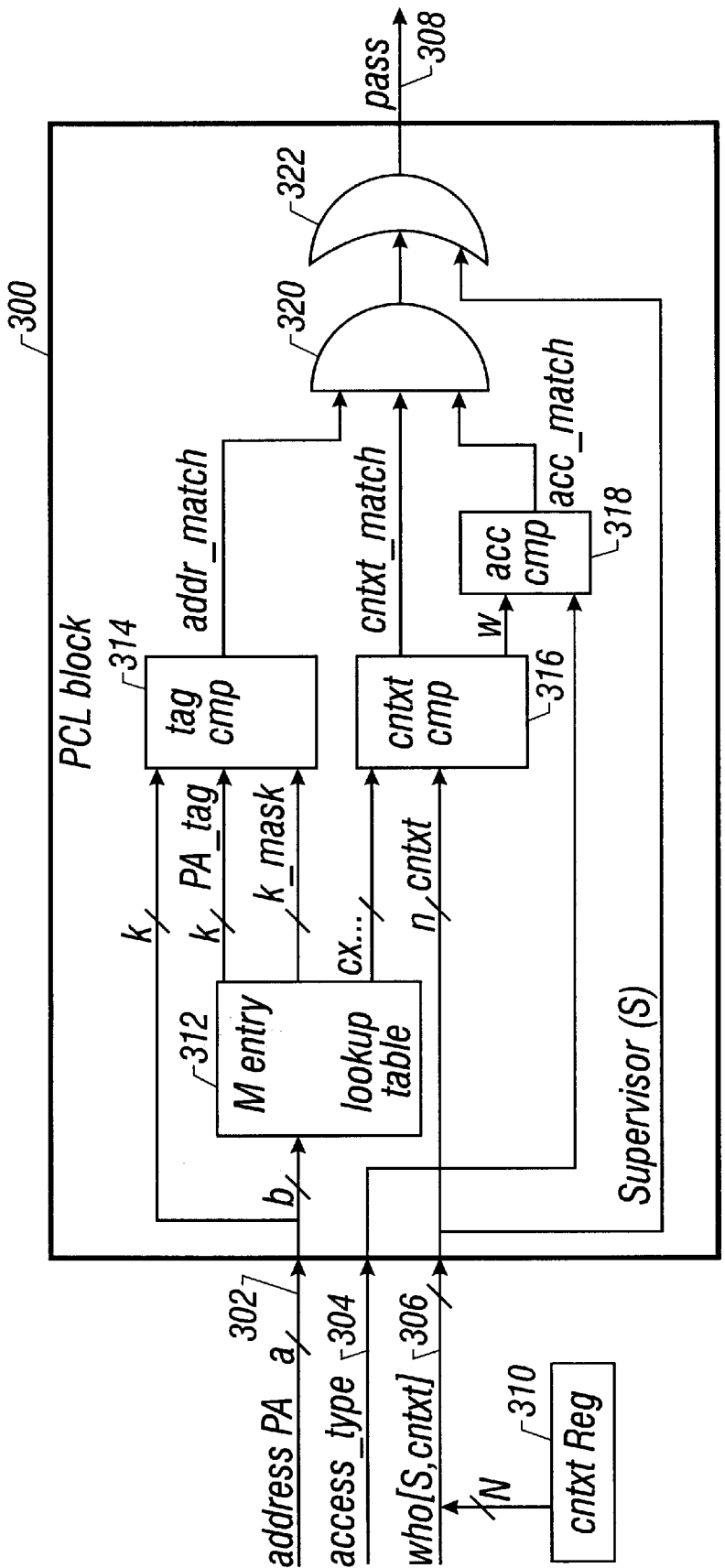
FIG. 3 is a schematic block diagram illustrating an embodiment of a protection check logic block that implements a direct-mapped lookup table for resource protection.

Referring to FIG. 3, a schematic block diagram illustrates an embodiment of a protection check logic block 300 that implements a model for access control using a simple and efficient example of a function $f$. Input lines to the protection check logic block 300 include a plurality a of address (PA) lines 302, an access_type line 304, and a plurality of process identifier (who[]) lines 306. The protection check logic block 300 has only a single output line, a pass line 308, for designating the protection check result, either "pass" or "nopass".

The address (PA) lines 302 carry a physical address signal generated as part of a request from a master requester such as a processor. The access_type line 304 carries an access type signal that is generated by the master requester to designate the type of request, such as a read type or a write type.

The process identifier (who[]) lines 306 carry a supervisor (S) bit signal and a multiple-bit context signal. In some embodiments, the process identifier (who[]) lines 306 omit the context signal. The supervisor (S) signal is issued by a processor in multiple circumstances. First, the processor issues the supervisor (S) signal while making an address transaction request that is generated as a consequence of execution of a privileged instruction. Second, the processor issues the supervisor (S) signal when the processor is operating in supervisor mode. Accordingly, in the illustrative embodiment, operations of the protection check logic block 300 are indistinguishable whether the processor is executing a privileged instruction or executing in the supervisor mode. Generally, only privileged software, such as an operating system kernel, may cause the supervisor (S) signal to become asserted. The context signal includes a plurality N of context bits from a context register 310 that designates the context number of the currently running process. In some embodiments, the context register 310 is inside the processor and is set by the processor in processor software. In other embodiments, a processor does not supply the context number of an executing user process at the processor interface so that the context register 310 is implemented outside the processor as shown in FIG. 3.

The protection check logic block 300 includes a multiple (M)-entry direct-mapped lookup table 312, a tag comparator 314, a context comparator 316, and an access comparator 318. The direct-mapped lookup table 312 receives a portion b of the lines of the a lines of the address (PA) lines 302 while the remaining portion k of the PA lines 302 are passed to the tag comparator 314. Based on the b-bit physical address signal, the direct-mapped lookup table 312 generates a k-bit physical address tag and a k-bit mask that are passed to the tag comparator 314. The direct-mapped lookup table 312 performs a lookup operation on each transaction access in the system for each master requester. Also based on the b-bit physical address signal, the direct-mapped lookup table 312 generates a context signal for comparison to the context number on the process identifier (who[]) lines 306.

The direct-mapped lookup table 312 includes storage for protecting M protection domains using a direct-mapped lookup table structure. The direct-mapped lookup table 312 is direct-mapped because b bits from the physical address of a transaction request uniquely and directly decode to unique entries in the lookup table. The direct-mapped lookup table 312 is typically constructed from random access memory or a set of registers although other types of storage may be utilized. The direct-mapped lookup table 312 has $2^b$ entries with each entry defining a protection domain or protecting an address space having a size of $2^{(a-b+k)}$ bytes. The number of bits k is determined by a k_mask field in each entry. The b bits from the address (PA) lines 302 are used to index into the direct-mapped lookup table 312. The k bits from the address (PA) lines 302 are used for a tag match.

To illustrate the operation of the protection check logic block 300, a context is simplified to include two bits N=2. For N=2, four contexts are defined. A small number of context bits N, such as two or three is highly useful and advantageous, efficiently supplying a sufficient number of user level processes in many embedded applications including applications of Java™ processors or non-Java processors that run multiple instances of a Java Virtual Machine (JVM).

In other embodiments, the number of context bits N is defined to be a suitable number of bits for performing access control. In the illustrative embodiment, the contents of the lookup table entry have six fields:

<PA_tag[k_address_bits]><k_mask><cx0,w><cx1,w><cx2,w><cx3,w> where the <PA_tag[]> field is lookup table address, the k_mask field specifies the number of <PA_tag[]> bits for performing an address comparison to the address request PA[] from the transaction request, and the <cxn,w> fields specify context and write permission.

The <PA_tag[]> field and the <k_mask> field are used for defining an address space (<address_space>) or lookup tag matching, the selection of a domain address range. The <address_space> defining the protection domains appears only once in the lookup table of a protection check logic block. The <cxn,w> fields are not a part of the lookup tag match but instead define access for each protection domain, thereby serving as an access control list (ACL). The access control list (ACL) is a list of context numbers allowed to access the <address_space>.

The <PA_tag[]> field for a particular value defined by the b bits designates a range of addresses included in a protection domain. The size of the protection domain designated by the <PA_tag[]> field is variable. The <k_mask> field which is also defined by the b bits sets the size of the protection domain. The lookup table contains $M=2^b$ entries, each entry corresponding to a single protection domain. Only one entry is defined for each different value designated by the b bit entry to the lookup table. The lookup table is directly managed by software that programs the values in the lookup table by changing contents of the lookup table entries at a context switch time. Once the context is programmed, only the resources that are defined by the protection domains are protected during the execution of the context. Thus software can only directly control the number of protection domains determined by the number of bits b.

The access control list (ACL) defines the contexts allowed access to the defined protection domains using a specified logic of access control. In some embodiments including the illustrative embodiment, the logic of access control is a negative selection. Unless a requested context is present in the access control list (ACL), access is denied. In alternative embodiments, the logic of access control may be reversed so that access is denied of a match in the lookup table occurs.

In the illustrative embodiment, the four cx fields are each three bits in width and include two bits for context and one-bit as a w (write) permission flag. In another example, a system with eight contexts and N=3, then each cx field includes 3+1 bits. The cx field is initialized to a value 0x where context 0 is reserved for operating system context. All other values signify a user context number. If all cx entries are 0x0, then no user access is allowed to the corresponding protection domain. An unused entry in the direct-mapped lookup table 312 is also designated with all cx fields set to 0x0 so that operating system access does not distinguish between a valid protection domain and an invalid protection domain. This technique assumes that the operating system accurately and responsibly controls access. To further protect against subtle operating system defects or to easily detect and correct defects, an additional "valid" bit may be added to the entry and the entries in the direct-mapped lookup table 312 that do not contain a valid protection domain have the "valid" bit deasserted.

When the context number N is small, all $2^N$ entries may be simultaneously present in the direct-mapped lookup table 312 so that each context number may be enabled or disabled by the corresponding field in the entry set to the corresponding context number or to 0x0. When the context number N is larger, a limited number of context fields may be present that hold any context number. In one embodiment, any context field may hold any number, although all $2^N=4$ entries are shown to be present for the small context number N=2.

In a more complicated example, a system includes a=32 address (PA) lines 302, b=4 defining sixteen protection domains, and k=8 tag bits. The direct-mapped lookup table includes sixteen entries and is indexed bit bits PA[31:28]. The tag in each entry is k=8 tag bits (PA_tag[27:20]) and is matched with input address bits PA[27:20]. The number of tag bits that are used for a tag match is determined by the k_mask field in the entry selected by PA[31:28]. For example, if the k_mask is 0xC0 ("1100 000" in binary), then bits PA[27:26] are compared to the tag PA_tag[27:26] and the size of the protection domain or address space is PA[25:0] or 64 Mbytes.

The individual entries may protect a differently sized protection domain. In the example hereinbefore, the maximum and minimum sizes of the address space range from 256 Mbytes when k_mask is 0x00, to 1 Mbyte when k_mask is 0xFF. A sixteen entry lookup table protects up to sixteen nonoverlapping protection domains.

The tag comparator 314 receives the k-bit portion of the signal on the address (PA) lines 302, the k-bit physical address tag and the k-bit mask and generates an address-match signal. In particular, the tag comparator 314 compares k bits of an address input on the address (PA) lines 302 to the k bits of <PA_tag[k_address_bits]> as specified by the <k_mask> field generated by the direct-mapped lookup table 312. If a match occurs, the tag comparator 314 asserts the address_match signal.

The context comparator 316 receives the context number on the process identifier (who[]) lines 306 and the context generated by the direct-mapped lookup table 312 and determines a context-match signal and a write signal that is input to the access comparator 318. Specifically, the context comparator 316 compares the context input signal on the process identifier (who[]) lines 306 to all of the context fields cx0, cx1, cx2, and cx3 of the selected entry of the direct-mapped lookup table 312. If any of the context fields matches the input context signal, the context comparator 316 asserts the context_match signal and passes the value of 'w' from the matching context field to the access comparator 318.

The access comparator 318 receives the access type signal on the access_type line 304 and the write signal 'w' from the context comparator 316 and generates an access-match signal. The access comparator 318 accesses the write signal 'w' from the context comparator 316 and compares the write signal 'w' to the signal on the access_type line 304. If the access type is write and 'w' is asserted, the access comparator 318 asserts the access_match signal. If the access type is read, the access comparator 318 always asserts the access_match signal.

The address-match signal, the context-match signal, and the access-match signal are input to an AND-gate 320 and the result of the AND operation is ORed with the supervisor (S) bit from the process identifier (who[]) lines 306 by an OR-gate 322 to generate the pass signal on the pass line 308.

Figure 4:
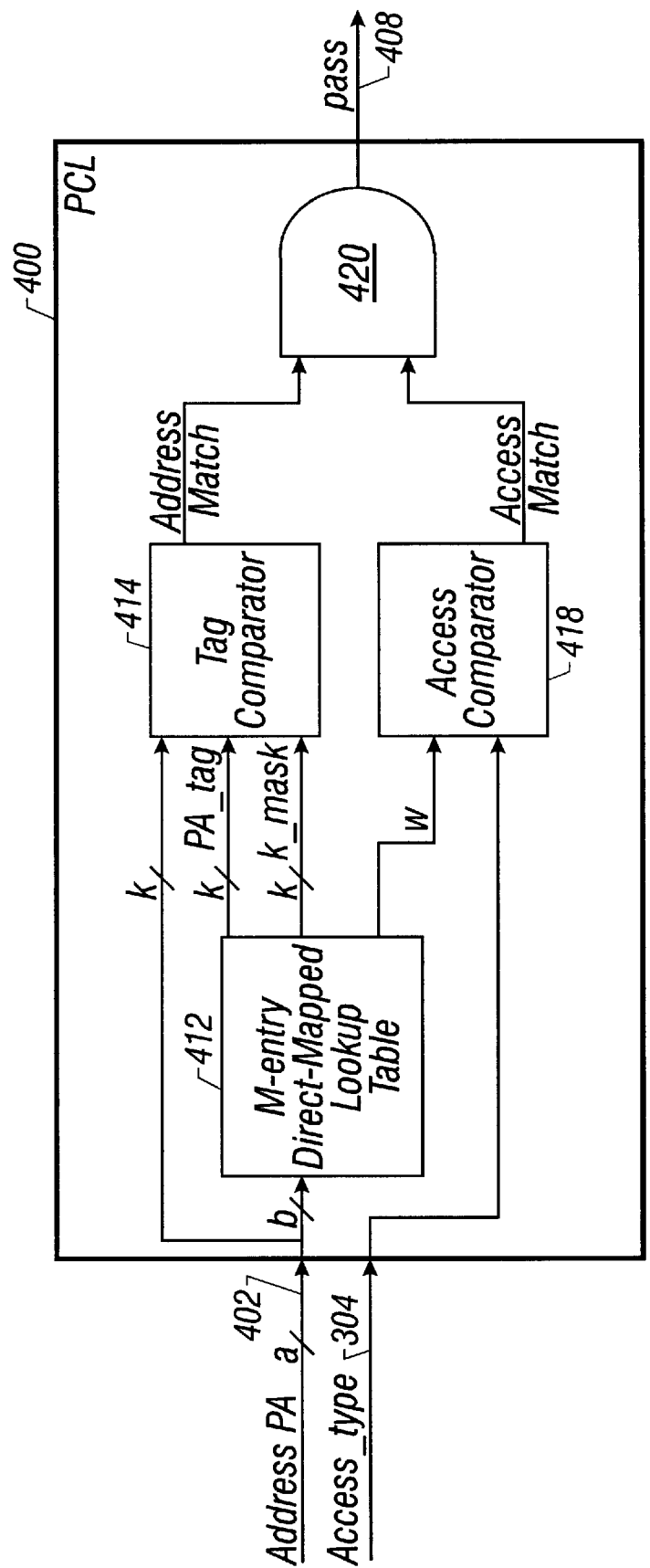
FIG. 4 is a schematic block diagram illustrating an embodiment of a DVMA PCL block that implements a model for access control using a function $f$.

Referring to FIG. 4, a schematic block diagram illustrates an embodiment of a DVMA PCL block 236 that implements a model for access control using a function $f$. Input lines to the DVMA PCL block 236 include a plurality a of address (PA) lines 402 and an access_type line 404. The DVMA PCL block 236 has only a single output line, a pass line 408, for designating the "pass" or "nopass" protection check result.

The address (PA) lines 402 carry a physical address signal generated as part of a request from a master requester such as an I/O device 208 or an other device 210 communicating via the DMA bus 224 as is shown in FIG. 2. The access_type line 404 carries an access type signal that is generated by the master requester to designate the type of request, such as a read type or a write type.

The DVMA PCL block 236 includes a multiple (M)-entry lookup table 412, a tag comparator 414, and an access comparator 418. The direct-mapped lookup table 412 receives a portion b of the lines of the a lines of the address (PA) lines 402 while the remaining portion k of the PA lines 402 are passed to the tag comparator 414. Based on the b address lines, the direct-mapped lookup table 412 generates a k-bit physical address tag and a k-bit mask that are passed to the tag comparator 414.

The tag comparator 414 receives the k-bit portion of the signal on the address (PA) lines 402, the k-bit physical address tag and the k-bit mask and generates an address-match signal.

The access comparator 418 receives the access type signal on the access_type line 404 and a fixed write signal, and generates an access-match signal.

The address-match signal and the access-match signal are input to an AND-gate 420 and the result is the pass signal on the pass line 408.

The illustrative embodiment omits connection of process identifier (who[]) lines, a supervisor (S) bit signal, and a multiple-bit context signal to the DVMA PCL block 236. A supervisor or privileged mode is not implemented via the DMA bus 224. Multiple contexts are not employed so that context lines, a context comparator, context information in a direct-mapped lookup table 412, and a context_match signal are not implemented in the illustrative DVMA PCL block 236.

In some embodiments, a DMA protection check logic block, such as the DVMA PCL block 236, may be deployed for direct memory access protection in a system that includes a processor memory management unit which protects the memory and programmed input/output but does not protect direct memory access.

The protection check logic block 300 shown in FIG. 3 and the DVMA PCL block 236 shown in FIG. 4 illustrate different types of protection logic blocks and different access control functions $f$ that may be implemented. Suitable access control functions $f$ may, for example, include or omit context, or include or omit supervisory (S) control. Typically an access control function $f$ is derived based on design requirements of an overall system.

Figure 5:
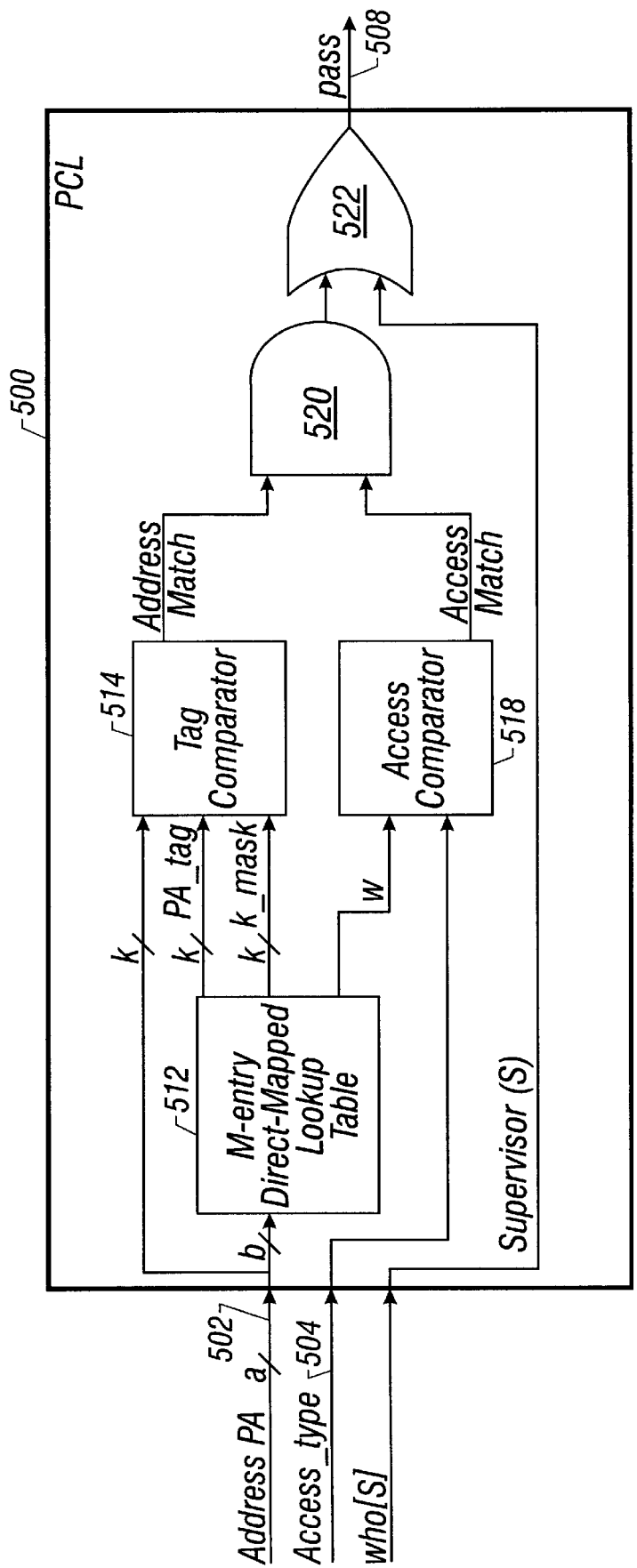
FIG. 5 is a schematic block diagram showing an alternative embodiment of a protection check logic block that implements an access control function $f$ in which a supervisor (S) bit is used with no context bits to perform access control.

Referring to FIG. 5, an alternative embodiment of a protection check logic block 500 implements an access control function $f$ in which a supervisor (S) bit is used with no context bits to perform access control. An example of a system that does not use context bits is a system that includes only a single processor and the single processor hosts a single Java Virtual Machine and an underlying operating system. The Java Virtual Machine and the underlying operating system execute with the same shared context and the same shared address space although access to some devices and memory locations is restricted to the operating system alone. Context bits are not used since only a single context is included in the system. Accordingly, the signal on the process identifier (who[]) lines 506 includes the supervisor (S) signal alone. An asserted supervisor (S) signal indicates that the operating system is requesting access rather than the hosted application.

Protection domains implemented using hardware structures for controlling access to restricted address spaces prevent, for example, a software bug in an application that is hosted by the operating system from corrupting the device state in the restricted spaces.

Figure 6:
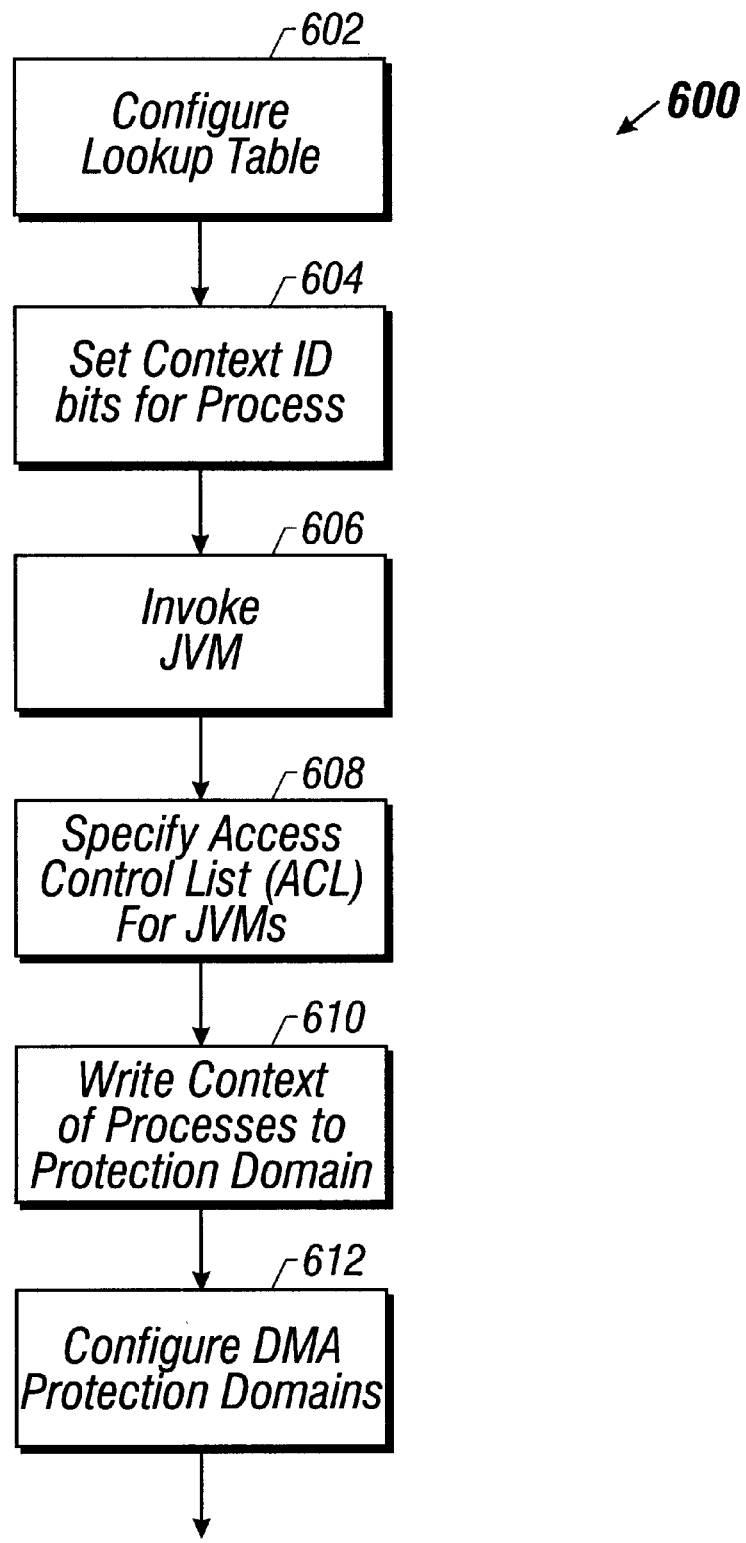
FIG. 6 is a flow chart which illustrates operations of a software routine for configuring or initializing a protection check logic block.

Referring to FIG. 6 in combination with FIGS. 3 and 4, a flow chart illustrates operations of a software routine 600 for configuring or initializing a protection check logic block 300. The protection check logic block 300 configuring or initializing operation is typically performed at system initialization by an operating system. Alternatively, the operating system may dynamically change the entries in the lookup table as new devices or resources are added to the system. Further alternatively, the operating system may change entries to the lookup table at the time of a context switch to change the protection check logic block to reflect only the protection domains that are defined for the executing context.

The direct-mapped lookup table 312 is initialized or configured in an operation 602 by operating system software or other privileged software that accesses the direct-mapped lookup table 312 to initialize or modify the protection domains. A privileged memory-mapped address is defined that is accessed to read and write information to the direct-mapped lookup table 312. Generally, a hardware controller (not shown) for managing programmed input/output access to the direct-mapped lookup table 312 is included in a system to deny access to the direct-mapped lookup table 312 when unprivileged access is attempted. In one example, the protection check logic block 300 may be implemented to control access to the direct-mapped lookup table 312 by defining storage in the direct-mapped lookup table 312 as an address space of a protection domain and allowing access to the instructions only when the supervisor (S) bit is asserted.

In a set context operation 604, the operating system sets context ID bits for process level context switches in the context register 310. The set context operation 604 is omitted for protection check logic blocks that do not include context specification in the process identifier (who[]) lines 306.

Host software invokes a Java Virtual Machine (JVM) process in operation 606. At the time of the invocation of the Java Virtual Machine (JVM) process, an access control list (ACL) for the JVM process may be specified to the operating system in operation 608 using an operating system-specific Applications Programming Interface (API). Alternatively, the operating system may protect some devices by allowing only operating system accesses to the device and directing that all access to protected domains takes place through the operating system. Any direct user access, an access that does not proceed through the operating system, that is directed to a protected resource results either in a trap to the operating system or a suitable error handling operation.

In an operation 610, the operating system writes the context number of the individual user processes to a protection domain entry in the direct-mapped lookup table 312 to which the user process is allowed access. By limiting access to resources to accesses that are allowed by the direct-mapped lookup table 312, a user process or user application executing on a system with no memory management unit cannot accidentally or maliciously access a protected resource without explicit permission from the operating system.

In an operation 612, which is applicable to systems that include a DVMA PCL block, DMA protection domains are configured or initialized. The operating system writes page addresses of the pages to which the direct memory access control is allowed to the direct-mapped lookup table 412 of the DVMA PCL block 236 in the DVMA transaction path 237. Accordingly, any errant DMA device is disallowed access to resources unless the accesses are previously and specifically authorized. An access that is not authorized is caught by the DVMA PCL block 236 and access is denied with the fault reported to the operating system for diagnostic usage or operation of the errant DMA device terminated.

Figure 7:
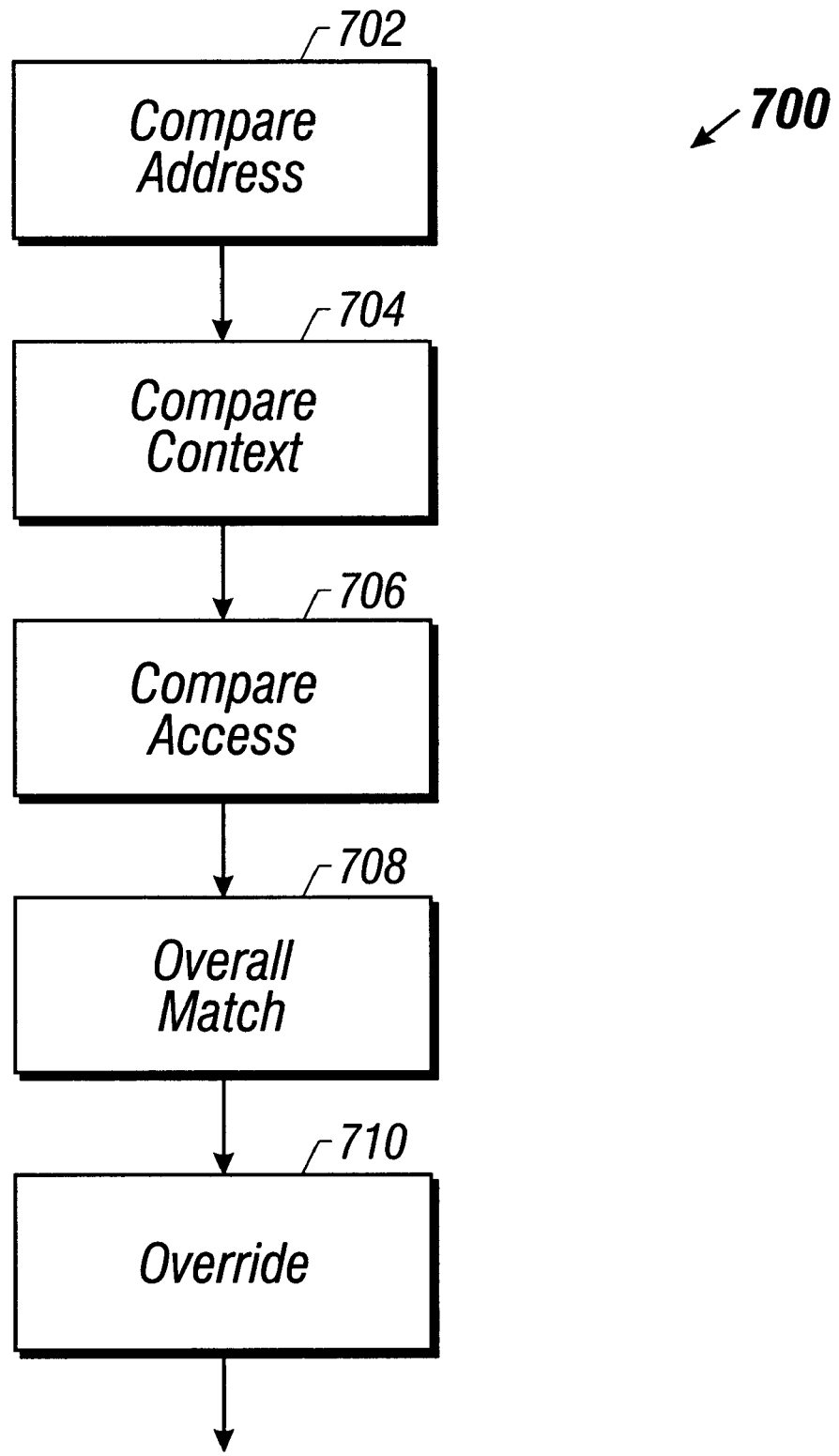
FIG. 7 is a flow chart which illustrates operations of a software routine for configuring or initializing a protection check logic block.

Referring to FIG. 7 in combination with FIG. 3, a flow chart illustrates operations 700 performed by the protection check logic block 300 to control access to protection domains of protected resources. In an address compare operation 702, the tag comparator 314 compares k bits of an address input on the address (PA) lines 302 to the k bits of <PA_tag[k_address_bits]> as specified by the <k_mask> field generated by the direct-mapped lookup table 312. If a match occurs, the tag comparator 314 asserts the address_match signal.

In a context compare operation 704, the context comparator 316 compares the context input signal on the process identifier (who[]) lines 306 to all of the context fields cx0, cx1, cx2, and cx3 of the selected entry of the direct-mapped lookup table 312. If any of the context fields matches the input context signal, the context comparator 316 asserts the context_match signal and passes the value of 'w' from the matching context field to the access comparator 318.

In an access compare operation 706, the access comparator 318 accesses the write signal 'w' from the context comparator 316 and compares the write signal 'w' to the signal on the access_type line 304. If the access type is write and 'w' is asserted, the access comparator 318 asserts the access_match signal. If the access type is read, the access comparator 318 always asserts the access_match signal.

In an overall match operation 708, a "pass" result is generated if matching occurs for all three parameters of address, context, and access. A match is designated by asserted signals for all of the address_match, the context_match, and the access_match lines.

In an override operation 710, an asserted supervisor (S) bit signal overrides all combinations of address, context, and access mismatches so that a "pass" signal is asserted automatically regardless of the result of the lookup table operation.

Figure 8:
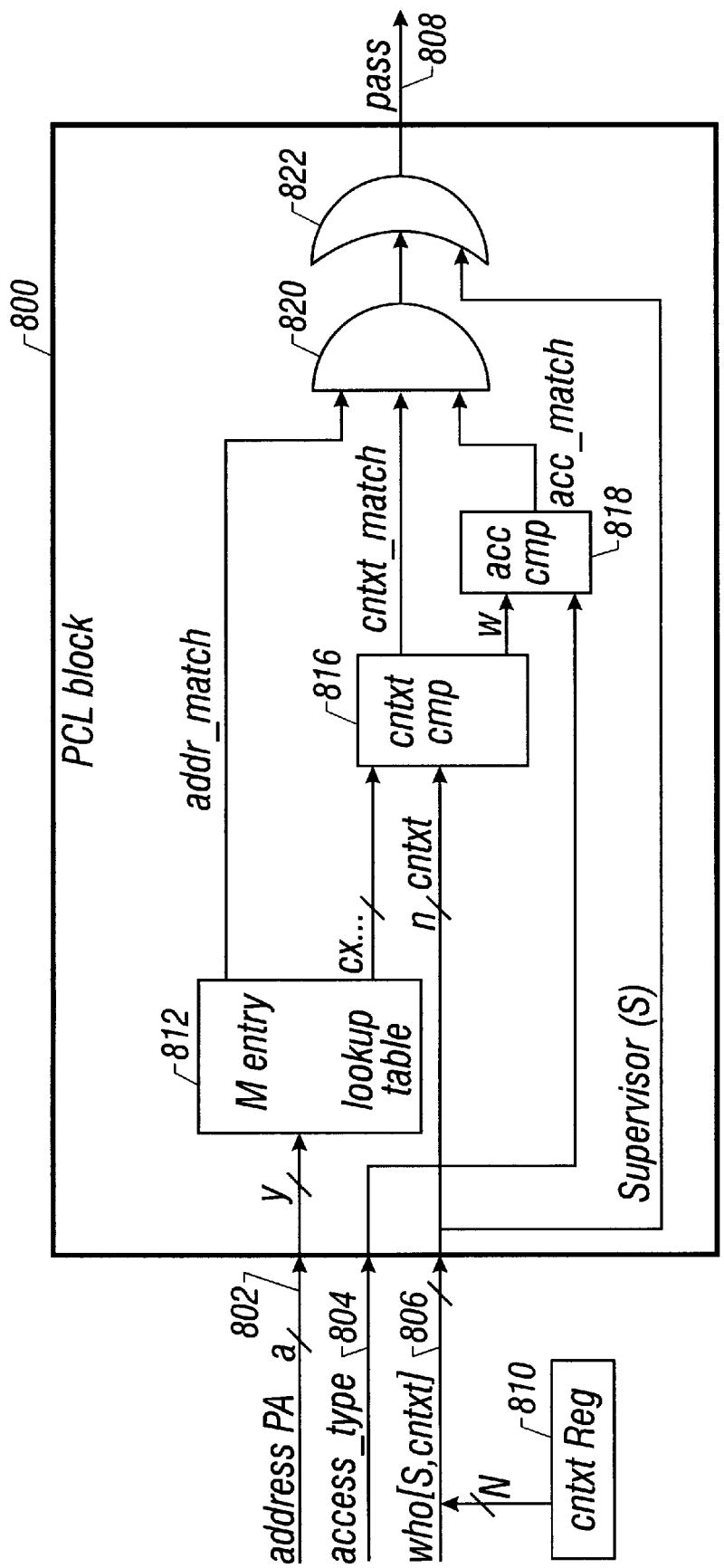
FIG. 8 is a schematic block diagram illustrating an embodiment of a protection check logic block that implements a fully associative lookup table for resource protection.

Referring to FIG. 8, a schematic block diagram illustrates an embodiment of a protection check logic block 800 that implements an M-entry fully associative lookup table 812 for resource protection. The fully associative protection check logic block 800 includes the fully associative lookup table 812, a context comparator 816, and an access comparator 818. The fully associative protection check logic block 800 is similar to the protection check logic block 300 illustrated in FIG. 3 and performs a similar or identical function ƒ. However, the fully associative protection check logic block 800 has an M-entry fully associative lookup table 812 rather than a direct-mapped lookup table. The fully associative lookup table 812 is used to directly look up y=b+k address bits from address (PA) lines 802, where y is the number of address bits PA that are sufficient to identify the address space of a protection domain. The number of entries M is selected independently from the number of address bits y. The number of entries M are selected from a range of one entry to $2^y$ entries.

If y bits of the address PA input to the fully associative lookup table 812 are matched, the fully associative lookup table 812 asserts an address_match signal and generates a context signal or access control list (ACL) stored in the fully associative lookup table 812 that corresponds to they bits. The fully associative lookup table 812 generates a valid access control list (ACL) if the address_match signal is asserted. As in the case of the protection check logic block 300 shown in FIG. 3, the context comparator 816 compares the access control list (ACL) to the context applied on process identifier (who[]) lines 806 to generate a context_match signal and a write 'w' signal, and the access comparator 818 compares the write 'w' signal from the context comparator 816 to an applied access_type signal to generate an access_match signal. When the address_match signal is deasserted, logical AND function logic 820 ensures that the AND function is deasserted so that the result context_match of the context comparator 816 and the result access_match of the access comparator 818 are immaterial.

An advantage of the fully associative lookup table 812 over the direct-mapped lookup table 312 is that the fully associative lookup table 812 allows overlapping protection domains and protection domains having arbitrary patterns. The direct-mapped lookup table 312 only allows one protection domain for each valid decode of the b bits, making protection domains nonoverlapping. In contrast, the fully associative lookup table 812 accommodates an arbitrary number of protection domains so long as the fully associative lookup table 812 contains a unique bit pattern defined by the contains a unique bit pattern defined by they input bits. Only the address spaces for which protection is sought are programmed in the fully associative lookup table 812. Configuration or initialization of the fully associative lookup table 812 for nonimplemented protection domains is not necessary.

Figure 9:
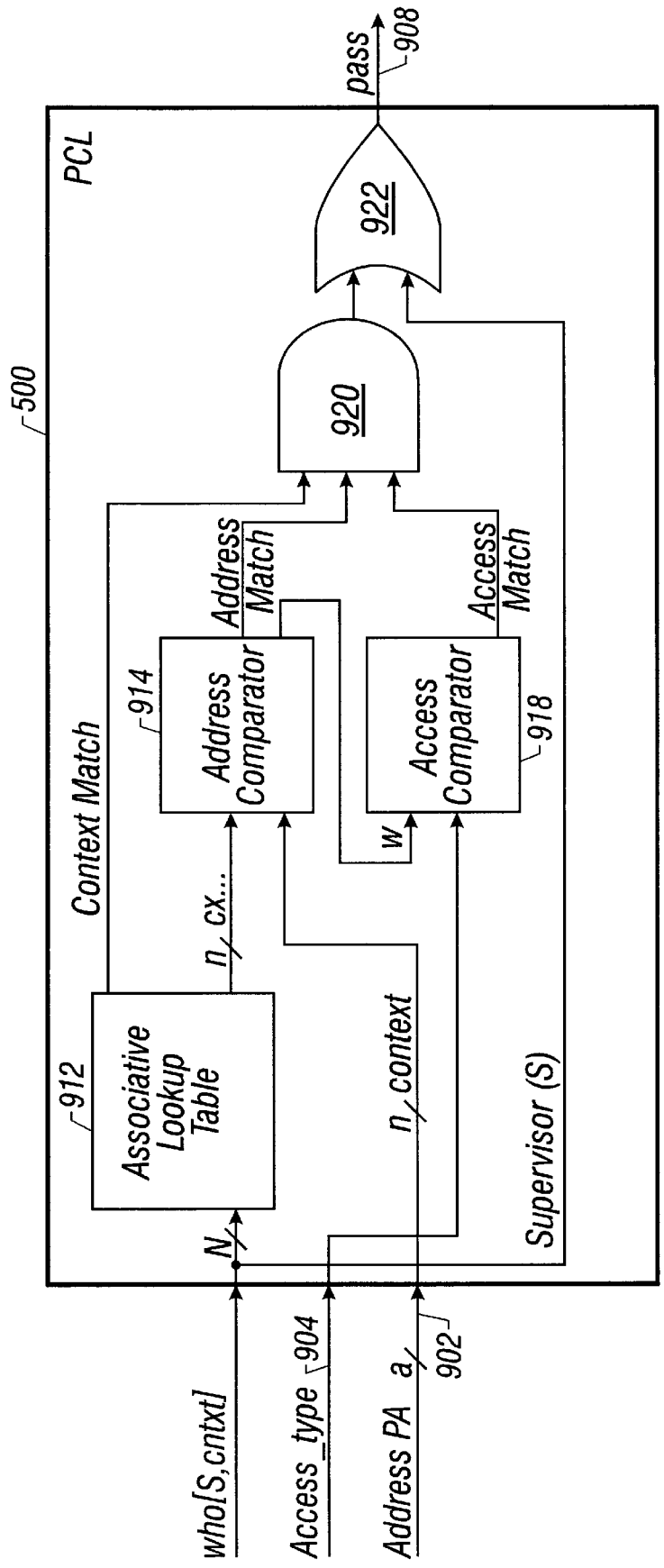
FIG. 9 is a schematic block diagram illustrating an embodiment of a protection check logic block that implements a fully associative lookup table with entries of the lookup table corresponding to a context rather than a domain.

Referring to FIG. 9, a schematic block diagram illustrates an embodiment of a protection check logic block 900 that implements a fully associative lookup table 912 with entries of the lookup table corresponding to a context rather than a domain. Each entry in the fully associative lookup table 912 specifies one context number and one address space that is accessed for the corresponding context. The input signal to the protection check logic block 900 includes N context bits. Software controlling the protection domains using the protection check logic block 900 operates by composing a new entry for each combination of protection domain and context. Since a particular protection domain may be defined for multiple contexts and a particular context may be defined for multiple protection domains, the lookup table 912 is typically larger than lookup tables with a single entry for each protection domain.

An embodiment of a protection check logic block using a context-based lookup table may also be implemented using a direct-mapped lookup table.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the described parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

For example, although the protection check logic block 300 depicted in FIG. 3 and the operations performed in the flow chart shown in FIG. 7 relate to a direct-mapped lookup table, other embodiments of an address and context matching may be employed.

Furthermore, a specific example of a function $f$ is described. Other exemplary functions may otherwise be implemented including simplified functions, more complex derivative functions, as well as functions that entirely different from the described function $f$. Other functions may be defined that address specific design specifications.

What is claimed is:

1. A resource protection apparatus for controlling access to a resource on a transaction path between an access request device and the resource, the transaction path including physical address signal lines and at least one access signal line, the resource protection apparatus comprising:

an access control path coupled to the transaction path in parallel with the transaction path, the access control path having input terminals coupled to the physical address signal lines and the at least one access signal line;

a protection check logic coupled to the access control path for snooping on transactions on the transaction path, the protection check logic further including:

a storage having input terminals coupled to at least a subset of the physical address signal lines, the storage holding data for designating a plurality of protection domains within the resource and data for designating accessibility of the plurality of protection domains, the protection domains and accessibility of the protection domains being determined based on signals carried by the physical address signal lines; and a decision logic coupled to the storage and coupled to the transaction path, the decision logic comparing transaction path signals carried by at least a subset of the physical address signal lines and the at least one access signal line to signals to signals from the storage designating the protection domains and accessibility of the protection domains and generating an allowability signal on the basis of the comparison, the allowability signal being generated in time to abort a disallowed transaction.

2. A resource protection apparatus according to claim 1, wherein:

the protection check logic storage includes:
an address space storage storing a plurality of address tags and address masks; and
an access control list storing a plurality of context elements, the context elements corresponding to respective protection domain addresses and determining transaction allowability for the respective protection domain addresses.

3. A resource protection apparatus according to claim 1, wherein:

the access control path is coupled to the transaction path by a plurality of address input lines for receiving a resource address signal;
the protection check logic storage includes:
an address space storage coupled to the access control path and storing a plurality of address tags and address masks corresponding to a plurality of protection domain addresses; and
the decision logic includes:
an address comparator coupled to the address input lines and coupled to the address space storage for comparing a transaction path address signal against an address tag as modified by an address mask of a protection domain and generating an address comparison result.

4. A resource protection apparatus according to claim 3, wherein:

the protection check logic storage further includes:
an access control list storing a plurality of context elements, the context elements corresponding to respective protection domain addresses and determining transaction allowability for the respective protection domain addresses; and
the decision logic includes:
a context comparator coupled to a context input line and coupled to the address space storage for comparing a context input signal and a context element of the access control list and generating a context comparison result.

5. A resource protection apparatus according to claim 4, wherein:

the decision logic includes:
an access comparator coupled to an access type input line and coupled to the context comparator for comparing an access type input signal and an access permission of the access control list and generating an access comparison result.

6. A resource protection apparatus according to claim 5, wherein:

the decision logic includes:
a logic coupled to the access comparator, the context comparator, and the address comparator, the logic generating a logic result as a function of the address comparison result, the context comparison result, and the access comparison result.

7. A resource protection apparatus according to claim 4, wherein:

the decision logic includes:
a logic coupled to the context comparator and the address comparator, the logic generating a logic result as a function of the address comparison result and the context comparison result.

8. A resource protection apparatus according to claim 4, wherein:

the decision logic includes:
a logic coupled to the address comparator and coupled to a supervisor input signal, the logic generating a logic result as a function of the address comparison result and the supervisor input signal.

9. A resource protection apparatus according to claim 3, wherein:

the address tag designates a variable size address space, and the address mask designates a size of the variable size address space.

10. A resource protection apparatus according to claim 9, wherein:

the address space storage is a direct-mapped lookup table.

11. A resource protection apparatus according to claim 1, wherein:

the access control path is coupled to the transaction path by a plurality of address input lines receiving a resource address signal;
the protection check logic storage includes:
an address space storage coupled to the access control path and storing a plurality of address match elements corresponding to a plurality of protection domain addresses, the address space storage for generating a lookup table address match signal; and an access control list storing a plurality of context elements, the context elements corresponding to the plurality of protection domain addresses and determining transaction allowability for the respective protection domain addresses; and the decision logic includes:

a context comparator coupled to a context input line of the transaction path and coupled to the address space storage for comparing a context input signal and a context element of the access control list and generating a context comparison result.

12. A resource protection apparatus according to claim 11, wherein:

the decision logic further includes:

an access comparator coupled to an access type input line of the transaction path and coupled to the context comparator to receive the context comparison result, the access comparator for comparing an access type input signal and an access permission of the access control list and generating an access comparison result.

13. A resource protection apparatus according to claim 12, wherein:

the decision logic further includes:

a logic coupled to the access comparator, the context comparator, and the address space storage, the logic generating a logic result as a function of the lookup table address match, the context comparison result, and the access comparison result, the logic result being a pass signal on the concurrence of an address match, a context match, and an accessibility match.

14. A resource protection apparatus according to claim 11, wherein:

the decision logic includes:

a logic coupled to the context comparator and the address space storage, the logic generating a logic result as a function of the lookup table address match and the context comparison result.

15. A resource protection apparatus according to claim 11, wherein:

the address space storage includes a plurality of address match elements corresponding to a plurality of protection domain addresses, the address space storage for generating an address match result signal.

16. A resource protection apparatus according to claim 15, wherein:

the address space storage is a fully associative lookup table.

17. A resource protection apparatus according to claim 1, wherein:

the transaction path is a memory access path from a processor to a memory including a plurality of address lines designating a memory address.

18. A resource protection apparatus according to claim 1, wherein:

the transaction path is a programmed input/output access path from a processor to a device including a plurality of address lines designating an I/O address.

19. A resource protection apparatus according to claim 1, wherein:

the transaction path is a direct memory access (DMA) access path from a device to a memory including a plurality of address lines designating a DMA address.

20. A resource protection apparatus for controlling access to a resource on a transaction path between an access request device and the resource, the resource protection apparatus comprising:

a protection check logic coupled to the transaction path for snooping transactions on the transaction path, the protection check logic further including:

a storage coupled to the protection check logic, the storage including a plurality of elements classifying the resource according to protection domain or context; and a decision logic coupled to the storage, the storage and the decision logic in combination implementing a model for access control having a form pass|nopass= $f$(context[], rw, address[]) in which the address[] specifies a physical address of a protection domain that is accessed in a transaction, the context[] specifies a process for which the protection domain is protected, rw specifies whether a transaction accessing the protection domain is a read or write access, the decision logic comparing transaction data on the transaction path to transaction allowability data defined by the function $f$ and generating an allowability signal on the basis of the comparison.

21. A resource protection apparatus according to claim 20, wherein:

the function $f$ is implemented at a plurality of levels of address granularity.

22. A resource protection apparatus according to claim 20, wherein:

the context[] specifies a process for which a resource address space is protected;

the rw parameter designates whether a transaction is a read or write transaction; and the address[]) designates an address of a current transaction request.

23. A resource protection apparatus for controlling access to a resource on a transaction path between an access request device and the resource, the resource protection apparatus comprising:

an access control path coupled to the transaction path in parallel with the transaction path;

a protection check logic coupled to the access control path for snooping on transactions on the transaction path, the protection check logic further including:

a storage coupled to the protection check logic, the storage including a plurality of elements classifying the resource according to protection domain or context; and a decision logic coupled to the storage, the storage and the decision logic in combination implementing a model for access control having a form pass|nopass= $f$(context[], rw, address[]) in which the address[] specifies a physical address of a protection domain that is accessed in a transaction, the context[] specifies a process for which the protection domain is protected, rw specifies whether a transaction accessing the protection domain is a read or write access, the decision logic comparing transaction data on the transaction path to transaction allowability data defined by the function $f$ and generating an allowability signal on the basis of the comparison.

24. A resource protection apparatus according to claim 23, wherein:

the function $f$ is implemented at a plurality of different levels of address granularity.

25. A resource protection apparatus according to claim 23, wherein:

the context[] specifies a process for which a resource address space is protected;

the rw parameter designates whether a transaction is a read or write transaction; and the address[]) designates an address of a current transaction request.

26. A resource protection apparatus according to claim 23, wherein:

the address space storage is a direct-mapped lookup table.

27. A resource protection apparatus according to claim 23, wherein:

the address space storage is a fully associative lookup table.

28. A resource protection apparatus according to claim 23, wherein:

the transaction path is a memory access path from a processor to a memory.

29. A resource protection apparatus according to claim 23, wherein:

the transaction path is a programmed input/output access path from a processor to a device.

30. A resource protection apparatus according to claim 23, wherein:

the transaction path is a direct memory access (DMA) access path from a device to a memory.

* * * * *